United States Patent [19]

Rosen

[11] 3,996,587
[45] Dec. 7, 1976

[54] SEMIPASSIVE RESPONDER UTILIZING A LOW VOLTAGE, LOW POWER DRAIN REFLECTIVE VARACTOR PHASE MODULATOR

[75] Inventor: Jerome Rosen, East Windsor, N.J.

[73] Assignee: RCA Corporation, New York, N.Y.

[22] Filed: Oct. 28, 1975

[21] Appl. No.: 625,884

[52] U.S. Cl. .......................... 343/6.8 R; 343/6.5 SS
[51] Int. Cl.² .......................................... G01S 9/56
[58] Field of Search ....... 343/6.5 SS, 6.8 R, 6.8 LC

[56] References Cited
UNITED STATES PATENTS 3,373,425  3/1968  Barischoff .................. 343/6.8 R
3,914,762  10/1975  Klensch .................. 343/6.8 LC X Primary Examiner—T.H. Tubbesing
Attorney, Agent, or Firm—E. J. Norton; J. D. Lazar; M. A. Lechter

[57] ABSTRACT

A semipassive responder for use in a communication system wherein an interrogating unit transmits an interrogation signal to illuminate the responder. The responder generates, in response to incident interrogation signals, a phase-coded reply signal, utilizing a low voltage, low power-drain reflective varactor phase modulator.

7 Claims, 1 Drawing Figure

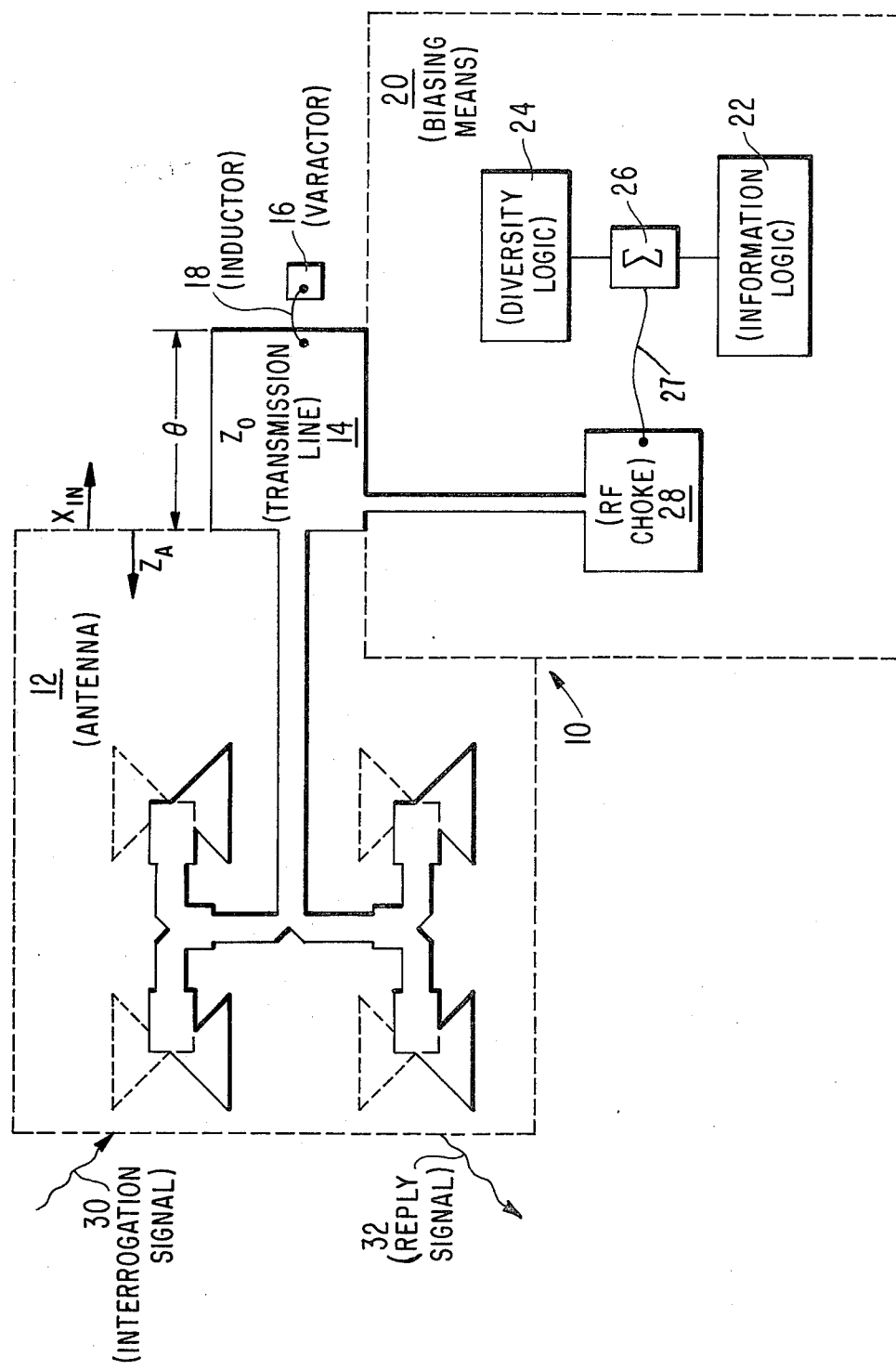

SEMIPASSIVE RESPONDER UTILIZING A LOW VOLTAGE, LOW POWER DRAIN REFLECTIVE VARACTOR PHASE MODULATOR

CROSS-REFERENCE TO RELATED APPLICATIONS

Of interest is copending application Ser. No. 576,604, by Kaplan and Ritzie, entitled "A Homodyne Communication System," filed on May 12, 1975 and assigned to the same assignee as the present invention.

BACKGROUND OF THE INVENTION

1. Field of the Invention

The present invention relates to semipassive responders for communication systems and, in particular, to a "signpost" for vehicle location systems.

2. Description of the Prior Art

The aforementioned copending application Ser. No. 576,604 by Kaplan and Ritzie entitled "A Homodyne Communication System" describes a communication system, suitable for use in an automatic vehicle locating (AVL) system, wherein a homodyne interrogating unit transmits a continuous wave RF interrogation signal to illuminate a semipassive responder or signpost. The term "semipassive" as used herein refers to a responder which operates on a local source of d.c. energy but is not provided with a local source of R.F. energy, such R.F. energy being derived from the incident R.F. interrogation signal. The responder, in turn, radiates a coded response back to the interrogation unit. In one embodiment of such a homodyne communication system the responder provides a reply signal having impressed thereon a periodic differential phase shift of, for example, 180° at one of two periodic rates, a mark or space frequency, in accordance with sequential bits of a coded message. The reply signal is subjected at the responder to a further periodic differential phase shift of, for example, approximately 90°, at a so-called "diversity rate." The sequence of mark or space frequency bits in the reply signal is detected in the homodyne interrogating unit to determine the coded message. The further phase shifting, hereinafter referred to as "phase diversity," is utilized to counteract nulls in the homodyne interrogating unit output signals caused by given relative phase relationships between the interrogation and reply signals. Thus, in the above-described embodiment the semipassive responder requires a phase modulator capable of generating differential phase shifts in excess of 180°, preferably in the vicinity of 270°, at the operating frequencies of the system. Such operating frequencies are typically in the 10 GHz range.

Phase modulators capable of producing differential phase shifts in substantial excess of 180°, and specifically in the vicinity of 270°, typically utilize a plurality of varactor diodes or a directional coupling device, such as one or more circulators or quadrature hybrid devices, or both. Such prior art varactor phase modulators are described in U.S. Pat. No. 3,479,615 issued Nov. 18, 1969 to R. V. Garver, entitled "Varactor Continuous Phase Modulator Having a Resistance in Parallel with the Varactor." Further description of such varactor phase modulators may be found in the following articles: R. N. Hardin et al, "Electronically-Variable Phase Shifters Using Variable Capacitance Diodes," Proceedings of the IRE, Vol. 48, pp. 944–945, May 1960; R. M. Searing, "Variable Capacitance Diodes Used as Phase-Shift Devices," Proceedings of the IRE (correspondence), Vol. 49, pp. 640–641, March 1961; C. S. Kim et al., "Varactor S-Band Direct Phase Modulator," IEEE Journal of Solid-State Circuits, Vol. SC-1, pp. 45–51, 1966; R. V. Garver, "360° Varactor Linear Phase Modulator," IEEE Transactions on Microwave Theory and Technique, Vol. MTT-17, March 1969, pp. 137–147; and B. T. Henoch et al., "A 360° Reflection-Type Diode Phase Modulator," IEEE Transactions on Microwave Theory and Techniques, January 1971, pp. 103–105.

Prior art responders utilizing varactor phase modulators, including a plurality of varactor diodes, a circulator or hybrid device, or both, have one or more limitations or constraints that render them unsuitable for environments with low energy sources. A phase modulator utilizing a plurality of varactor diodes consumes more power obviously than a phase modulator utilizing only a single varactor diode. Circulators and hybrid devices are relatively complex devices and represent an additional expense in the implementation of the responder even if, as implemented, only a single varactor is needed. For large scale usage of such responders, such as in an automatic vehicle location (AVL) system, it is desirable that the responder be simple and inexpensive and, to maximize battery life, consume as little power as practicable.

Summary of the Invention

The present invention is directed to a semipassive responder for use in a communication system comprising an antenna, a transmission line, an inductor and a voltage-controlled variable-capacitance device. The antenna is coupled to the transmission line, which is, in turn, coupled to the inductor. The variable-capacitance device is connected in series with the inductance and the transmission line. The biasing means is coupled to the variable-capacitance device. The impedance of the antenna, the impedance and electrical length of the transmission line, the inductance of the inductor and response of the variable-capacitance device are maintained in critical relationship to provide for controlled phase shifts exceeding 180° and approaching 270°.

BRIEF DESCRIPTION OF THE DRAWING

The sole FIGURE of the drawing is a block schematic of one embodiment of a semipassive responder in accordance with the present invention.

DETAILED DESCRIPTION OF THE PREFERRED EMBODIMENT

The drawing shows a semipassive responder 10 comprising a conventional antenna 12, a transmission line 14, a variable-capacitance device, such as a varactor diode 16, an inductive bond wire 18 and a suitable biasing means 20. Antenna 12, preferably a corporate network printed circuit array of the type described in U.S. Pat. No. 3,587,110, issued June 22, 1971, has a predetermined impedance $Z_A$ and, is directly coupled to transmission line 14. Transmission line 14, preferably of the strip-line type, has a predetermined characteristic impedance $Z_0$ and a predetermined electrical length $\theta$ and is coupled to varactor 16 through inductive bond wire 18. Bond wire 18 has a predetermined inductance L. If antenna 12 is of the printed circuit array type, antenna 12 and transmission line 14 may be formed on a common substrate, with bond wire 18 and varactor 16 mounted thereon. The values $Z_A$, $Z_0$, $\theta$ and L are chosen to provide a specified desired phase shift ($\Delta\phi$) for a given change in varactor biasing voltage, hereafter to be designated a "differential phase shift," as will be explained.

Biasing means 20 typically includes suitable information logic 22 and diversity logic 24. Detailed description of suitable information logic 22 and diversity logic 24 is found in the aforementioned copending application "A Homodyne Communication System" Ser. No. 576,604 by Kaplan and Ritzie. Briefly, information logic 22 is arranged to generate a frequency shift keyed (FSK) signal, the FSK signal alternating in voltage between a first level and a zero level at one of two periodic rates, the aforementioned mark or space frequencies, in accordance with sequential bits of a message word. Diversity logic 24 is arranged to generate a signal, hereinafter termed the "diversity signal," which alternates in voltage, at a predetermined diversity rate, between a second level and the zero level. The diversity rate is typically higher than the bit rate of the message, but lower than the mark and space frequencies. The FSK and diversity signals are summed in a conventional summer 26. The output signals of summer 26 are coupled through a bond wire 27 to a R.F. choke 28 and therefrom through transmission line 14 and inductor 18 to varactor 16. The output signal of summer 26 biases varactor 16. Thus, biasing means 20 provides a bias signal for varactor 16 having one of four discrete voltage levels: zero, the first voltage level, the second voltage level, or the sum of the first and second voltage levels.

As noted above, responder 10 operates within a communication system. An interrogation signal 30, typically a continuous wave signal at a predetermined frequency in the 10 GHz range, illuminates antenna 12. Responder 10, in effect, imparts an instantaneous phase shift to interrogation signal 30, in accordance with the instantaneous bias on varactor 16, such bias being the sum of the respective instantaneous amplitudes of the FSK and diversity signals and radiates the phase-shifted signal, as a reply signal 32. The above-mentioned first and second voltage levels are preferably chosen to generate respectively approximately 180° and 90° differential phase shifts with respect to the phase of reply signal 32 with respect to interrogation signal 30 with varactor 16 biased at the zero voltage level. It is noted that in some applications unavailability of power sources at requisite discrete values may require deviation from differential phase shifts of 180° and 90°. Phase values utilized in an implemented system are described below.

Phase modulation of the interrogation signal 30 is effected as the respective amplitudes of the FSK and diversity signals vary. The phase-modulated signal is radiated from antenna 12 as reply signal 32 back to the interrogating unit. As explained in detail in the aforementioned copending application Ser. No. 576,604, the sequence of mark and space frequency bits in the reply signal is detected in the interrogating unit to extract thereby the message. The phase-diversity of reply signal 32, due to the diversity bias signal, counteracts nulls in the homodyne interrogation unit output signal caused by given relative phase relationships between the interrogation and reply signals.

More specifically, in the operation of responder 10, interrogation signal 30 is passed from antenna 12 through transmission line 14 and inductor 18 to varactor 16. Varactor 16, in accordance with the instantaneous bias thereon, imparts a phase shift to the incident signal and reflects the signal back through inductor 18, and transmission line 14 to antenna 12, which, in turn, radiates the phase-shifted signal as reply signal 32. RF choke 28 serves to isolate the biasing means 20 logic circuitry from the radio frequency interrogation and reply signals. Transmission line 14 and inductor 18, as will be explained, increase relatively small differential phase shifts in reply signal 32 due to the reactance changes of varactor 16 as the bias level thereon is altered.

The instantaneous phase of reply signal 32 with respect to interrogation signal 30 is equal to $\pi$ minus twice the arctangent of the ratio of the instantaneous impedance, $X_{IN}$, measured at the output terminals of antenna 12 (across transmission line 14) looking towards varactor 16, to the impedance, $Z_A$, of an antenna 12. Impedance $X_{IN}$, as will be explained below, is a function, in part, of the instantaneous capacitance of varactor 16. Varactor 16 may be characterized as a series combination of a fixed resistance, a nonlinear resistance, and a voltage-controlled capacitance. The resistance components of varactor 16 are assumed for the purposes of the following discussion to be negligible. It is noted, however, that such resistances cause RF power dissipation and thus affect the amplitude of reply signal 32.

Phase modulation of reply signal 32 is effected by varying the instantaneous bias ($V_i$) on, and hence the instantaneous capacitance $C(V_i)$ of, varactor 16. It should be noted that if varactor 16 was coupled directly to antenna 12, the maximum differential phase shift $\Delta\phi$, as by varying the bias voltage between first and second levels, $V_1$ and $V_2$, is 90°. The addition of inductive bond wire 18 can increase such maximum $\Delta\phi$ only up to 180°. Thus, in order to obtain a $\Delta\phi$ substantially in excess of 180°, in accordance with the present invention transmission line 14 is inserted between antenna 12 and varactor 16. The characteristic impedance $Z_0$ and electrical length $\theta$ of transmission line 14 are chosen in critical relationship with the reactive change of varactor 16 in response to bias voltage levels $V_1$ and $V_2$, the inductance L of bond wire 18 and the impedance $Z_A$ of antenna 12. The desired differential phase shift $\Delta\phi$ for given biasing levels $V_1$ and $V_2$, $V_1$ and $V_2$ respectively corresponding to, for example, the aforementioned zero voltage level and the sum of the first and second voltage levels, may be expressed by the relation:

$$\Delta\phi = 2\left[\tan^{-1}\left(\frac{X_{IN}(V_2)}{Z_A}\right) - \tan^{-1}\left(\frac{X_{IN}(V_1)}{Z_A}\right)\right] \quad (1)$$

$X_{IN}(V_i)$ is calculated to be $$X_{IN}(V_i) = \frac{\omega L - \frac{1}{\omega C(V_i)} + Z_0 \tan\theta}{1 - \frac{\omega L - \frac{1}{\omega C(V_i)}}{Z_0} \tan\theta} \quad (2)$$

where $\omega L$ is the reactance of bond wire 18, $$\frac{1}{\omega C(V_i)}$$

is the reactance of varactor 16 for the instantaneous bias voltage level $V_i$, and $Z_0 \tan \theta$ is the impedance of transmission line 14, all measured at the operating frequency, $\omega/2\pi$.

Thus, by choosing proper values for L, $Z_0$ and $\theta$, for given values of operating frequency, antenna impedance, bias voltage levels, and varactor response, a semipassive responder 10 may be implemented which can impart to reply signal 32 differential phase shifts in substantial excess of 180° without requiring a plurality of varactors or a directional coupling device.

Although equation (1) expressing the calculation of $\Delta \phi$ indicates that a phase shift of 360° is theoretically possible, in practice such phase shifts are limited by the practicable form of inductor 18 and the inherent lossy effects of the transmission line 14 and the inductor 18.

In various communication systems, for example as noted above in automatic vehicle location systems, it is desirable for the responder to consume as little power as possible. Accordingly, since power is a function of the voltage squared, it is desirable that the bias voltage levels be relatively low. By iterative computation of equations (1) and (2) for given values of operating frequency, antenna impedance and varactor response, a practicable responder utilizing low voltage bias levels can be derived.

A semipassive responder in accordance with the present invention has been implemented for operation in the 10 GHz range utilizing a RCA L-1569 Gallium Arsenide varactor diode for varactor 16, a corporate network printed circuit array antenna 12 with $Z_A = 50$ ohms, and a stripline transmission line 14 having a characteristic impedance of 12 ohms and an electrical length of 140° at 10.6 GHz. The inductance of bond wire 18 is approximately 0.25 nanohenries. The modulator was fabricated as a microwave integrated circuit on a 15 mil alumina substrate. The implemented responder operated on biasing levels of 0, 14, 8.4 and 22.4 volts, chosen in accordance with commercially available long-lived, high energy-density primary cells of 2.8 volts. Such bias levels effected the following respective differential phase shifts ($\Delta \phi$) in reply signal 32: 0°, 203°, 130° and 236°. Measurements have shown that other biasing levels will effect phase shifts as listed in Table 1. Also listed in Table 1 is the return loss (ratio of the magnitude of reply signal 32 to the magnitude of interrogation signal 30) at the respective biasing levels.

TABLE 1

| Biasing Voltage (volts) | $\Delta \phi$ (degrees) | Return Loss (db) |
| --- | --- | --- |
| 0 | 0 | 0.2 |
| 3.2 | 30 | 0.68 |
| 5 | 60 | 1.3 |
| 6.6 | 90 | 2.0 |
| 7.9 | 120 | 2.7 |
| 9.5 | 150 | 2.7 |
| 11.4 | 180 | 2.5 |
| 15.2 | 210 | 2.0 |
| 20.3 | 230 | 1.58 |
| 24 | 240 | 1.3 |
| 30 | 250 | 1.1 |

It should be understood that the implementation of a phase modulation in accordance with the present invention may require experimental adjustments to achieve a desired phase shift. The practical limits will depend upon the components used as indicated supra.

What is claimed is:

1. A semipassive responder for generating, in response to incident interrogation signals, a reply signal, said reply signal being shifted in phase in accordance with a sequence of code bits, said responder comprising:
    an antenna having a first predetermined impedance;
    a transmission line, connected to said antenna, said transmission line having a second predetermined impedance and a predetermined electrical length;
    an inductor, coupled to said transmission line, said inductor having a predetermined inductance;
    a voltage-controlled variable-capacitance device, responsive to bias signals applied thereto, connected in series with said inductor and said transmission line; and
    biasing means, coupled to said variable-capacitance device, for generating said bias signals, said bias signals being at a selected one of a plurality of voltage levels in accordance with said code bits, the impedance measured across said transmission line looking toward said variable-capacitance device being respectively a third predetermined impedance and a fourth predetermined impedance in response to a respective first and second selected ones of said voltage levels;
    said first and second predetermined impedances, said predetermined electrical length and said inductance being chosen such that twice the difference between the arctangent of the ratio of said third predetermined impedance to said first predetermined impedance and the arctangent of the ratio of said fourth predetermined impedance to said first predetermined impedance is equal to a predetermined differential phase shift.

2. The responder of claim 1, wherein said variable-capacitance device is a Gallium Arsenide Varactor diode.

3. The responder of claim 2, wherein: said varactor is a RCA L-1569 varactor, said first predetermined impedance is substantially 50Ω, said second predetermined impedance is substantially 12Ω, said electrical length is substantially 140° at 10.6 MHz and said inductance is substantially 0.25nh.

4. The responder of claim 1, wherein said antenna is a corporate network printed circuit array and said antenna and said transmission line are formed on a common substrate.

5. The responder of claim 4, wherein said substrate is a 15 mil thick alumina substrate.

6. The responder of claim 1, wherein said bias signals comprise a frequency shift keyed (FSK) signal, said FSK signal varying in amplitude between first and second voltage levels at a predetermined mark or space frequency in accordance with said sequence of code bits.

7. The responder of claim 6, wherein said bias signals further include a diversity signal, said diversity signal varying in amplitude between said first voltage level and a third voltage level at a predetermined periodic rate, said biasing signals being the sum of said FSK and diversity signals.

* * * * *